United States Patent

[11] 3,634,631

[72] Inventor Wilbur R. Youngs
1811 Windsor, Findlay, Ohio 45840

[21] Appl. No. 823,609
[22] Filed May 12, 1969
[45] Patented Jan. 11, 1972

[54] MECHANICAL PUSHBUTTON OPERATING DEVICE
10 Claims, 7 Drawing Figs.

[52] U.S. Cl. .......... 179/90 CS
[51] Int. Cl. .......... H04m 1/48
[50] Field of Search .......... 179/90 CS, 90 AD, 90 B

[56] References Cited
UNITED STATES PATENTS

| | | | |
|---|---|---|---|
| 3,194,893 | 7/1965 | Auel | 179/90 |
| 3,505,476 | 4/1970 | Kelly et al. | 179/90 B |

*Primary Examiner*—Kathleen H. Claffy
*Assistant Examiner*—Tom D'Amico
*Attorney*—McNenny, Farrington, Pearne and Gordon

ABSTRACT: There is provided a device which may be placed over an existing digital keyboard, and which is characterized by a platelike member or card which may be drawn through the device in its superimposed condition over the keyboard. The card is provided with properly located mechanical members on the surface thereof which are capable of transmitting to the keys on a digit-by-digit basis a predetermined number as the card is drawn through the apparatus.

FIG. 4 FIG. 3

PATENTED JAN 11 1972 3,634,631

INVENTOR

WILBUR R. YOUNGS

BY

McNenny, Farrington, Pearne & Gordon

ATTORNEYS

MECHANICAL PUSHBUTTON OPERATING DEVICE

BACKGROUND OF INVENTION

This invention relates as indicated to a mechanical device for transferring to a digital keyboard a predetermined number and causing the operation on a digit-by-digit basis of keys corresponding to said predetermined number. This invention is particularly useful in conjunction with pushbutton telephone instruments, and while the principles of this invention are applicable as well to other digital keyboard devices such as 10-key calculators, e.g., adding machines, or calculating machines including digital keyboards having more than 10 keys, the invention will be described with reference to a pushbutton telephone keyboard.

In recent years, the telephone industry has begun to install pushbutton "dialing" on a rather large scale. Instruments including a pushbutton keyboard and the accompanying telephonic equipment is simplified and less troublesome than previous circular dial equipment. Moreover, such equipment is capable of accepting digital inputs at a much higher rate than possible with the older circular dial equipment. Still further, the capacity of the pushbutton equipment to accept telephone number inputs accurately is much greater than the rate at which the ordinary person is able to operate the keys manually.

It has now been found that a mechanical device of the type hereinafter more particularly described provides a simple effective means of "dialing" a multidigit telephone number by the simple expedient of pulling a card through a slot, for example, after the receiver has been removed from the cradle. Thus, a card or platelike member having encoded thereon a predetermined telephone number whether local, long distance, or special service may be provided and maintained in a suitable file for ready use. Emergency numbers such as police, fire, and physician may also be prepared. Still further, where telephone communication with a computer center is established, data may also be transmitted through corresponding numbers. The card elements may also serve additional purposes, for example the inclusion of advertising matter or business card information.

BRIEF STATEMENT OF THE INVENTION

Briefly stated, the present invention is in a device for mechanically operating one or more keys in a digital keyboard device and including in combination a frame assembly adapted to be positioned over the keyboard. Means are provided for holding the frame assembly in a predetermined position with respect to the keyboard. To operate the keyboard on a digit-by-digit basis, means are provided which include an elongated platelike member or card having means associated with at least one surface thereof adapted for coaction, either directly or indirectly, with the keyboard as the platelike member is passed over the keys. Reaction means are provided which coact between the frame and the platelike member to maintain the platelike member in predetermined coacting relation with the keyboard. As indicated above, this invention has special utility in connection with pushbutton "dialing" telephones. In the further description of this invention, reference will be had to multikey keyboards. To differentiate various parts of the keyboard, reference will be had to "rows" and "columns" of keys. It will be understood that the term "rows" represents the keys in a horizontal line. The term "-columns" has reference to keys in a vertical line as the operator views the keyboard.

DETAILED DESCRIPTION OF DRAWINGS

Figure 1:
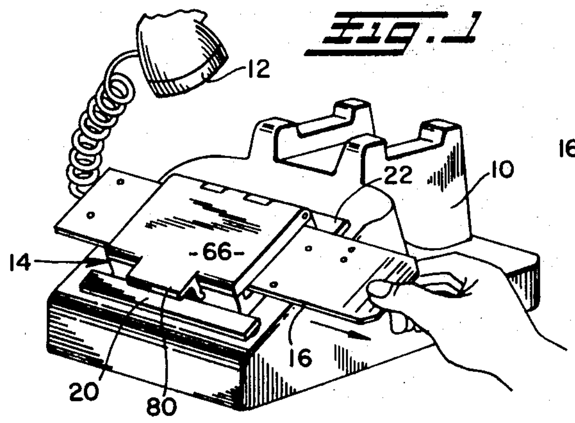
FIG. 1 is a fragmentary perspective illustration of a pushbutton telephone instrument having an embodiment of the present invention in operative position thereon and illustrating the manner of "dialing" a number in accordance herewith.

Referring now more particularly to FIG. 1, there is here shown in illustrative manner a telephone instrument 10 with the receiver 12 removed from the cradle to connect the device with the central switching station. Superimposed over the pushbutton keyboard (not shown in FIG. 1) is a device generally indicated by the number 14 which is an embodiment of the present invention. An operator is illustrated pulling a card 16 through the device 14 from left to right thereby mechanically transmitting to the keyboard a predetermined number.

KEYBOARD AND KEYBOARD COVERING DEVICE

Figure 3:
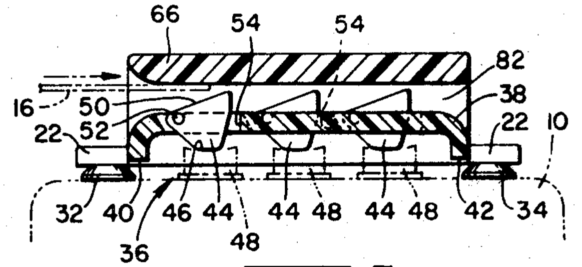
FIG. 3 is a cross-sectional view of the device shown in FIG. 2 as it appears in the broken plane indicated by the line 3—3 in FIG. 2.
Figures 2, 4, 5:
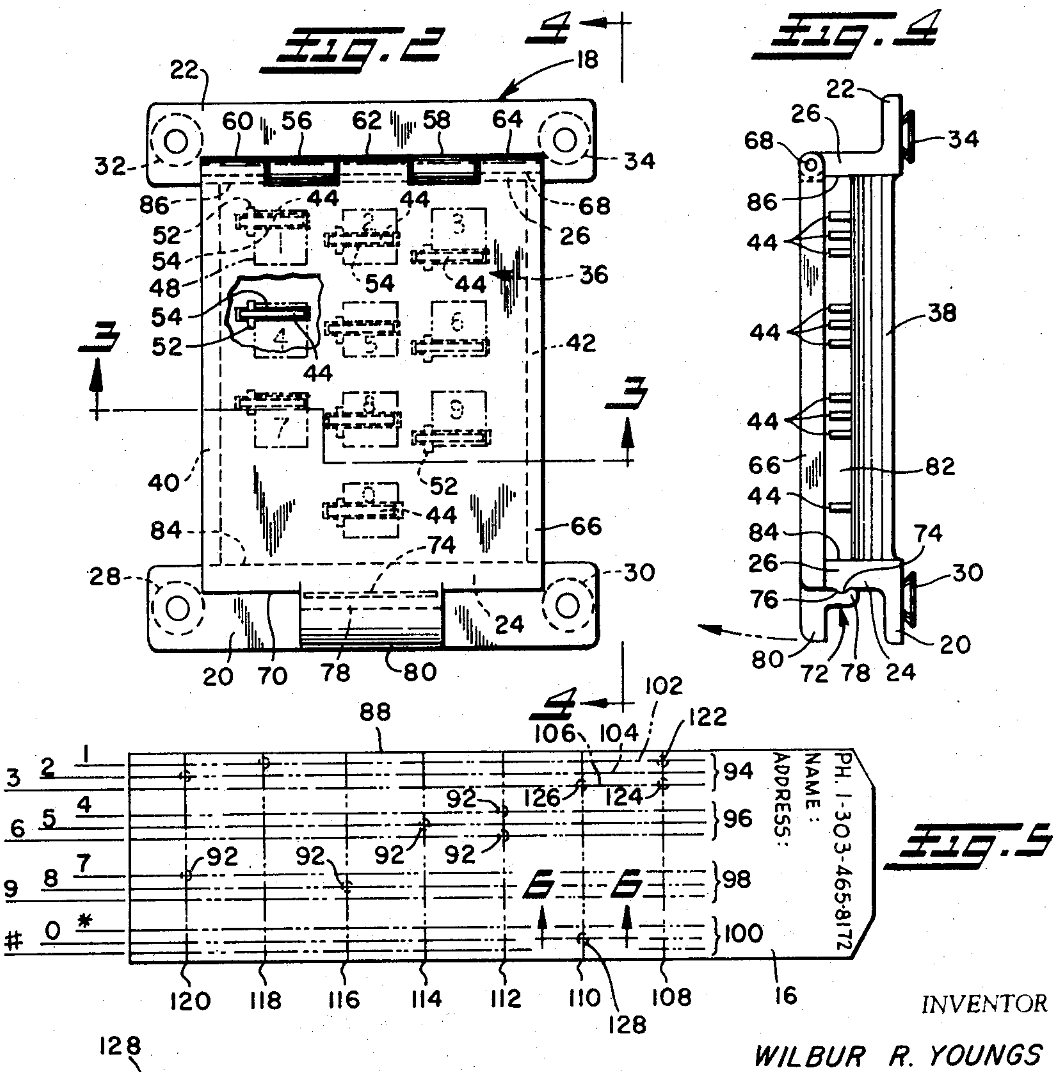
FIG. 2 is a top elevation showing a frame assembly in accordance with the present invention disposed over a now conventional 10-digit, three-column, four-row telephone instrument keyboard.
FIG. 4 is a side elevation of the device shown in FIG. 2 as it appears in the plane indicated by the line 4—4 of FIG. 2.
FIG. 5 is a platelike member having encoded thereon as projections out of the plane thereof the fictitious long-distance number 1-303-465-8172.

FIGS. 2, 3 and 4 illustrate in detail a preferred embodiment of the present invention. In this embodiment, there is provided a frame assembly generally indicated at 18 and including a front crossmember 20 and a rear crossmember 22. Crossmembers 20 and 22 are conveniently L shaped to provide upstanding portions 24 and 26 respectively. Crossmembers 20 and 22 are conveniently provided with rubber suction cups 28 and 30 and 32 and 34, respectively, to secure the device 14 in proper position above the keyboard, generally indicated at 36. Instead of rubber suction cups, any suitable means of securing or adhering the device 14 to the telephone instrument in predetermined aligned relationship with the keyboard 36 may be employed. Rubber suction cups 28, 30, 32 and 34 have been found satisfactory for this purpose particularly in view of the facts that they permit ready attachment and removal of the device 14 and in no way damage the instrument 10.

Spanning the space between crossmembers 20 and 22 is a keyboard-bridging member 38 having marginal downwardly turned flanges 40 and 42. The downturned flanges 40 and 42 in combination with the crossmembers 20 and 22 define, therefore, the rectangular frame assembly 18.

In the embodiment shown in the annexed drawings, the keyboard-bridging member 38 is provided with 10 cam-following members 44 arranged in and pivotally supported thereby. The lower marginal edge 46 of each cam follower 44 is configured and dimensioned for sliding and depressing coaction with an underlying key such as key 48 (FIG. 3). Also, the upper marginal edge 50 of each cam follower 44 is contoured and dimensioned for coaction with the platelike member or card 16 hereinafter described. Thus, as the card 16 is drawn through the device from left to right, the coded information contained thereon is transmitted directly to the cam followers 44 which, in turn, transmit the camming action whenever encountered to the underlying digital keys 48. Whereas the passage of the card itself may establish contact with each of the cam followers 44, the thickness of the encoded card or platelike member, e.g., one thirty-second inch, is insufficient to depress the keys 48 a distance sufficient to generate a signal corresponding to the key digit. As will be pointed out hereafter, the projections or surface treatment of the card made pursuant to the code coact with the cam followers 44 to cause them to depress still further to the point where the desired signal is created. Normally, the total amount of movement to activate the key, i.e., generate a digital signal, is approximately three thirty-second inch. Thus, the extent of projection of an encoded operator on the surface of the platelike member 16 must then be at least one-sixteenth inch in the particular embodiment described. Such design dimensions, however, are readily apparent to those skilled in the art and due allowance therefor is easily made.

As indicated above, the cam-following members 44 are conveniently pivotally secured in keyboard-bridging member 38. To this end, the transverse pivot pins 52 are provided for suitable embedment in receptacles provided in the bridging member 38. Slots 54 are provided in the bridging member 38 to allow free swinging movement of the cam followers 44 for at least a distance sufficient to perform their function of operatively transmitting the encoded matter to the keyboard. These parts may be made of plastic such as polyethylene, nylon, or teflon, hard rubber, or from poly (methyl methacrylate), poly(ethylene terephthalate), or the like. Any suitable means of pivotally supporting the cam followers for pivotal movement may be employed.

With particular reference to FIGS. 2 and 4, it will be observed that slots 54 and the corresponding cam followers 44 disposed therein are in staggered relation whereby each cam follower 44 communicating in a given row of digits, e.g., keys corresponding to digits 1, 2 and 3, lies in a unique plane. It is believed clear that were this not the case, there would be no means of distinguishing between an encoded digit 1 and encoded digits 2 or 3. However, where each cam follower 44 rotates in its own unique plane with respect to a given row of digits, separate transmission of the digital information is maintained. The stepped relation of the planes in which the cam followers 44 operate for the successive digits 1, 2 and 3, for example, is downward and to the right as the keyboard appears in FIG. 2. It is quite clear that the staggered relation may proceed in a direct line upward and to the right, or the line of staggering of such planes may be a broken line. For example, the plane of operation of cam follower 44 coacting with digital key 1 may be adjacent the upper marginal edge of the key 1. The plane of operation of cam follower 44 coacting with digital key 2 may be adjacent the lower marginal edge of said key. Finally, the plane of operation of the cam follower 44 cooperating with the key corresponding to the digit number 3 may lie along the midpoint of such key. Thus, any suitable arrangement of the planes in which the cam followers 44 operate may be selected so long as for any given row of keys each cam follower operates in a unique plane which is essentially normal to the plane of the keyboard and in alignment with the direction of movement of the platelike member or card 16.

In like manner, the cam followers 44 are arranged in juxtaposition for the rows of keys corresponding to the digits 4, 5 and 6; for the row of keys corresponding to the digits 7, 8 and 9, and for the row including the digit 0. If other key members are included in the row including the digit 0, a suitable staggered relation is likewise maintained.

The upper marginal edge of upstanding portion 26 (FIG. 4) is provided with hinge loops 56 and 58 in spaced relation for the reception of corresponding hinge loops 60, 62 and 64 correspondingly configured and spaced along the upper marginal edge of a reaction plate 66, the connection between the respective marginal edges being maintained by hinge pin 68. Along the opposite marginal edge 70 of reaction plate 66 there are provided releasible latching means generally indicated at 72. In the embodiment shown, these means include a longitudinally extending projection 74 disposed along the outer face of upstanding portion 26 and a corresponding recess 76 disposed for mating coaction with projection 74. The recess 76 is correspondingly disposed in a depending flange 78 integral with reaction plate 66. A suitable overhanging extension of the reaction plate 66 provides a suitable handle projection 80 to effect closure and release of the reaction plate 66 to provide for access to the keyboard whereby manual "dialing" may be effected. When the reaction plate 66 is in its latched position as shown in FIGS. 1, 2, 3, and 4, its disposition with respect to bridging member 38 is such as to create a longitudinally extending slot 82. The slot 82 provides guide means for admission of a platelike member or card 16 containing encoded digital information on at least one surface thereof. The longitudinally extending surfaces 84 and 86 on confronting surfaces of upstanding portions 24 and 26, respectively, provide guide members for confining the lateral displacement of the platelike member 16 within limits to maintain encoded means contained upon the surface thereof in proper alignment with the cam followers 44. The cam followers 44, because of their communication with the keys 48, which keys 48 are spring biased in a direction outwardly from the surface of the keyboard, coact to maintain the platelike member 16 in contact with reaction plate 66.

THE ENCODED PLATELIKE MEMBER

In FIG. 5 there is shown in plan view a typical card 16 which has encoded on the reverse surface thereof projections corresponding to the fictitious telephone number 1-303-465-8172. The platelike member 16 may be formed of any suitable material, e.g., metal, plastic, laminated materials, or the like. A particularly suitable material is a permanently deformable plastic of the type which is used for producing raised letter name tapes. The card 16 is dimensioned to enable sliding passage through the slot 82 with the longitudinal marginal edges 88 and 90 in relatively close abutting relation with guide surfaces 86 and 84, respectively, whereby lateral displacement of the card is limited so as not to exceed that distance which preserves contact of the encoded projections with the cam followers 44. The projections 92 are specially located on the surface of the card 16 as hereinafter described.

The present utility application here under consideration involves a keyboard composed of four horizontal rows as viewed in FIG. 2 and three vertical columns. Accordingly, the surface of the card 16 for "dialing" a pushbutton telephone is divided into four longitudinally extending files 94, 96, 98 and 100, respectively, each of which is in turn subdivided into three subfiles, as for example subfiles 102, 104 and 106. The spacing between the files 94 and 96, 96 and 98, and 98 and 100 is uniform and corresponds to the spacing between the keys 48. Within each of said files, the spacing between the subfiles, for example the subfiles 102 and 104, and 104 and 106, is also uniform and corresponds to the lateral displacement of the unique planes in which the successive cam followers 44 coacting with the keys 48 representing for example the digits 1, 2 and 3. The card 16 itself is also longitudinally subdivided into equally spaced ranks such as ranks 108, 110, 112, 114, 116, 118, and 120. The number of ranks on a given card may be varied to accommodate different telephone numbers. For example, in many installations it is necessary to add an extra digit such as a 9 in order to connect the instrument with an outside line. In such a case, an additional rank would need to be provided on the card 16. The number of ranks may be varied indefinitely. With the fictitious telephone number given, however, seven ranks have been found necessary to complete the coding.

Figure 6:
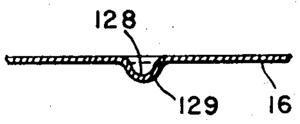
FIG. 6 is a fragmentary cross-sectional view on an enlarged scale of the platelike member shown in FIG. 5 as it appears in the plane indicated by the line 6—6 in FIG. 5.

Thus, for example, in the first rank 108 there appears in file 94, subfile 102, a depression having a cross section like that shown in FIG. 6. This corresponds to the digit 1. In the same file 94, but in subfile 106, there is another depression corresponding to the digit 3. It will be observed that as the card 16 is drawn through the device, the first contact with a cam follower 44 will be between the reverse side of depression 122 (which creates a cam member on the reverse side of card 16) corresponding to the numeral 1, and the subsequent contact will be established between the reverse side of depression 124 corresponding to the numeral 3. The numerals 1 and 3 may be disposed in the same rank on the card because of the lateral displacement of the keys corresponding to digits 1 and 3, and because of the unique planes in which the cam followers 44 operate. Since there is no depression in the number 2 subfile (104) in the first rank 108, the cam follower 44 coacting with the key 48 for the digit 2 is not activated by anything in that rank.

The next rank 110 is provided with a depression 126 located in file 94 on the subfile 106 corresponding to the digit 3. Also in the rank 110 is another depression 128 which is in the file 100, middle subfile, corresponding to the digit 0. As the card 16 is moved to the right as shown in FIG. 1, the depression 128 which provides a cam surface 129 on the reverse side of card 16 is in position for coaction with cam follower 44 coacting with the key 48 corresponding to the digit 0 and will strike that cam follower 44 before the depression 126 contacts the cam follower 44 coacting with the key 48 corresponding to the digit 3. In this manner, signals have now been generated for the long-distance access code 1 and the area code 303. The succeeding depressions 92 in the next succeeding ranks 112, 114, 116, 118 and 120 are located in the same manner and corresponding to the exchange code 465 and the instrument number 8172. Thus, when the card 16 is drawn through the device as shown in FIG. 1, signals corresponding to the telephone number are generated and in an amount of time which is approximately one-tenth the amount of time required to manually actuate 11 digits for the corresponding long-distance number.

As shown in FIG. 5, the numerals to the left of the card 16 identify the respective subfiles in the files 94, 96, 98 and 100 with the corresponding numerical identification.

Alternate means of achieving the same result may be employed. For example, instead of providing cam followers for indirect communication between the platelike member 16 and the keys 48, the keys 48 may be provided with individual caps formed, for example, from an elastomeric material and having projections lying in unique planes and extending through the keyboard-bridging member 38 for interception of the cam surfaces, such as cam surface 129 on card 16. It will be seen, therefore, that a plurality of preencoded cards may be prepared for frequently used numbers as well as for emergency numbers, e.g., police, fire, doctor, family, etc. Colored plastic or painted numbers can be used as indicia to permit rapid identification of a given card. These cards may also be used for display of advertising matter or business information.

There has thus been provided an accessory device for mechanically operating one or more keys in a keyboard by passing an encoded platelike member over the keyboard in a manner to actuate by mechanical means predetermined keys in a predetermined order in such keyboard.

What is claimed is:

1. A device for mechanically operating one or more keys in a digital keyboard device wherein the keyboard includes at least 10 digital keys of uniform size and configuration arranged in at least three columns and at least four rows comprising in combination:

a. a frame assembly adapted to be disposed over said keyboard;
b. means for holding said frame assembly in a predetermined position with respect to the keyboard;
c. means for operating digit-by-digit one or more keys in said keyboard, said means including:
   1. an elongated platelike member having a plurality of cam projections disposed in a predetermined pattern on at least one surface of said platelike member and corresponding to a predetermined number to be mechanically transmitted to said keyboard as the platelike member is passed over said keys and including
   2. a keyboard bridging member supported by said frame;
   3. key-actuating means including a separate cam follower for each key having a width less than one-third of the width of the key on said keyboard and pivotally mounted on said bridging member for limited rotation in a plane normal to said platelike member and adapted to coact with any corresponding cam projection on said platelike member for transmitting motion to any predetermined key in a direction normal to the plane of the platelike member, each said movable member for each successive key in a given row lying in a unique plane which is laterally displaced from the plane of every other member coacting with a key in said given row; and
d. reaction means coacting between said frame and said platelike member to maintain said platelike member in said predetermined mechanical coacting relation with said keyboard.

2. A device in accordance with claim 1 wherein the reaction means includes parallel guide surfaces for said platelike member spaced apart a distance sufficient to provide clearance for ready movement of said platelike member in a longitudinal direction between said parallel guide surfaces.

3. A device in accordance with claim 2 wherein said guide surfaces coact with the longitudinal edges of said platelike member.

4. A device in accordance with claim 2 wherein said guide surfaces coact with the front and backfaces of said platelike member.

5. A device in accordance with claim 1 wherein the reaction means includes an upper plate carried by said frame and adapted to overlie said platelike member to maintain said platelike member in mechanically coacting relation with said keys.

6. A device in accordance with claim 5 wherein said upper plate is hinged to said frame.

7. A device in accordance with claim 6 wherein said upper plate is hinged to said frame along one marginal edge thereof adjacent one of the longitudinal edges of said platelike member.

8. A device in accordance with claim 7 also including releasible locking means coacting between said upper plate and said frame.

9. A device in accordance with claim 1 wherein the reaction means includes an upper plate carried by said frame and hinged thereto, said upper plate movable on said hinge to a position parallel to said bridging member to define in combination therewith a longitudinally extending slot dimensioned to receive and to pass said platelike member in substantially fixed alignment with said rows of keys.

10. A device for mechanically operating a pushbutton telephone including a 10-key keyboard arranged in three columns and four rows, comprising in combination:

a. a frame assembly adapted to be disposed over said keyboard;
b. means for holding said frame assembly in a predetermined position with respect to said keyboard;
c. means for operating digit by digit one or more keys in said keyboard to dial a predetermined telephone number and including an elongated generally rectangular platelike member having camming projections extending from the surface thereof for coaction with said keyboard and positioned for correspondence with said predetermined telephone number;
d. a key bridging member carried by said frame;
e. a cam follower for each of said keys pivotally carried by said bridging member and being contoured and dimensioned along one marginal edge for coaction with the upper surface of the corresponding key, and contoured and dimensioned along its opposite marginal edge for coaction with a camming projection on said platelike member, whereby when said cam follower encounters a camming projection on said platelike member, the corresponding key is depressed a distance sufficient to initiate a signal corresponding to said key, the individual cam follower for each of the keys in each of said four rows lying in a unique plane;
f. an upper plate secured to said frame by a hinge along one marginal edge and including latch means for releasably holding said upper plate in a closed position over said bridging member, said upper plate when in the closed position being in parallel spaced relation to said bridging member to define a slot for guiding said platelike member in operative disposition for registry of the camming projections thereon with the corresponding cam followers.

* * * * *